United States Patent [19]

Sommer et al.

[11] Patent Number: 4,942,211
[45] Date of Patent: Jul. 17, 1990

[54] ORGANOPOLYSILOXANE COMPOSITIONS WHICH CAN BE CROSSLINKED TO FORM ELASTOMERS WITH THE ELIMINATION OF ALCOHOLS

[75] Inventors: Oswin Sommer, Burghausen; Norman Dorsch, Post Burghausen; Erhard Bosch, Burgkirchen; Alfred Kurz, Burghausen, all of Fed. Rep. of Germany

[73] Assignee: Wacker-Chemie GmbH, Munich, Fed. Rep. of Germany

[21] Appl. No.: 293,909

[22] Filed: Jan. 6, 1989

[30] Foreign Application Priority Data

Jan. 19, 1988 [DE] Fed. Rep. of Germany ....... 3801389

[51] Int. Cl.$^5$ ............................................. C08G 77/06

[52] U.S. Cl. ....................... 528/14; 524/399; 524/400; 524/777; 524/779; 524/780; 528/19; 528/34

[58] Field of Search ............... 524/399, 400, 777, 779, 524/780; 528/14, 34, 19

[56] References Cited

U.S. PATENT DOCUMENTS

| | | | |
|---|---|---|---|
| 3,161,614 | 12/1964 | Brown et al. | 528/34 |
| 4,273,691 | 6/1981 | MacLaury et al. | 524/400 |
| 4,461,854 | 7/1984 | Smith | 524/399 |
| 4,472,551 | 9/1984 | White et al. | 528/34 |

Primary Examiner—Melvyn I. Marquis

[57] ABSTRACT

The invention relates to organopolysiloxane compositions which can be crosslinked to form elastomers with the elimination of alcohols and are stabilized by salts of the second main group or sub-group with branched-chain carboxylic acids having from 5 to 15 carbon atoms.

11 Claims, No Drawings

ORGANOPOLYSILOXANE COMPOSITIONS WHICH CAN BE CROSSLINKED TO FORM ELASTOMERS WITH THE ELIMINATION OF ALCOHOLS

The present invention relates to organopolysiloxane compositions which have a long shelf life in the absence of moisture, but can be crosslinked in the presence of water, even at room temperature, to form elastomers which eliminate alcohols, and to a process for stabilizing such compositions.

BACKGROUND OF THE INVENTION

U.S. Pat. No. 4,424,157 to Chung discloses compositions which have a long shelf life in the absence of water, but crosslink at room temperature in the presence of water to form elastomers. These compositions are prepared by mixing a diorganopolysiloxane containing one Si-bonded hydroxyl group in each of the terminal units with a silane whose silicon atom is bonded to nitrogen, two monovalent hydrocarbon radicals via oxygen and one monovalent hydrocarbon radical via carbon, and if desired, a scavenger compound. U.S. patent application Ser. No. 069,749 (inventor E. Bosch et al, Wacker-Chemie GmbH) describes compositions which are composed of a diorganopolysiloxane containing one Si-bonded hydroxyl group in each of the terminal units and a di(hydrocarbyloxy)silane, where the remaining two valences of the silicon atom in the silane are saturated by a divalent hydrocarbylamino radical which is linked to the silicon atom by both an Si—C and an Si—N bond.

Therefore, it is an object of the invention to provide novel organopolysiloxane compositions which can be crosslinked at room temperature to form elastomers without th e elimination of corrosive, strongly basic or strongly acidic or noxious-smelling substances. Another object of the present invention is to provide organopolysiloxane compositions which can be stored for a long period of time in the absence of moisture without a significant change in their properties. A further object of the present invention is to provide a process for stabilizing organopolysiloxane compositions which eliminate alcohols on crosslinking.

SUMMARY OF THE INVENTION

The foregoing objects and others which will become apparent from the following description are accomplished in accordance with this invention, generally speaking, by providing a process for stabilizing organopolysiloxanes which eliminate alcohols on crosslinking which comprises adding salts of metals of main and sub-groups 2 of the Periodic Table with branched-chain carboxylic acids having from 5 to 15 carbon atoms to organopolysiloxane compositions which can be crosslinked with the elimination of alcohols.

The compositions of this invention contain organopolysiloxanes of the formula

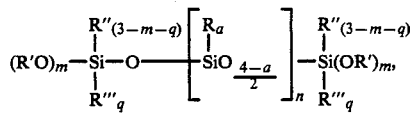 (I)

in which R represents radicals which are the same or different monovalent hydrocarbon radicals and substituted monovalent hydrocarbon radicals having from 1 to 13 carbon atoms; R' represents radicals which are the same or different monovalent hydrocarbon radicals having from 1 to 10 carbon atoms and which may be substituted by a $C_1$- to $C_3$- alkoxy group; R" represents radicals which are the same or different Si-C-bonded substituted alkyl radicals which have 1 to 18 carbon atoms and whose substituents may be amino, mercapto, acryloxy, methacryloxy, epoxy, allyl and cyclohexenyl groups, halogen atoms and cyano groups; R''' represents radicals which are the same or different $C_1$- to $C_3$-alkyl radicals; n is an integer having a value of at least 50; m is 1 or 2 and q is 0 or 1, with the proviso that 3-m-q is at least 1; a is in each case an integer having value of 0, 1, 2 or 3 and an average value of 1.8 to 2.2.

DESCRIPTION OF THE INVENTION

In the organopolysiloxanes of formula (I), the preferred radicals represented by R are monovalent hydrocarbon radicals which have 1 to 8 carbon atoms and substituted hydrocarbon radicals which are substituted by halogen atoms or cyano groups; R' radicals are alkyl radicals which have 1 to 10 carbon atoms, and in particular 1 to 3 carbon atoms, which may be substituted by methoxy or ethoxy groups; R" radicals are amino, mercapto, morpholino, glycidoxy, acryloxy and methacryloxy groups which are bonded to the silicon atoms via $C_2$- to $C_6$- alkylene radicals, where the amino and mercapto groups may be substituted by $C_1$- to $C_6$- alkyl, cycloalkyl, aminoalkyl and mercaptoalkyl groups.

Examples of preferred radicals represented by R are alkyl radicals, such as the methyl, ethyl, n-propyl, isopropyl, n-, sec- and t-butyl radicals, pentyl radicals, such as the n-, sec-, t- and neopentyl radicals, hexyl radicals, such as the n-hexyl radical, heptyl radicals, such as the n-heptyl radical, and octyl radicals, such as the n-octyl radical; alkenyl radicals, such as the vinyl and allyl radicals; cyclohexyl and cycloheptyl radicals; aryl radicals, such as the phenyl radical; aralkyl radicals, such as the benzyl, α- and β-phenylethyl radicals; alkaryl radicals, such as o-, m- and p-tolyl radicals and xylyl radicals; substituted hydrocarbon radicals, such as the β-cyanoethyl radical, the 3,3,3-trifluoropropyl radical and chlorophenyl radicals.

Examples of preferred radicals reprsented by R' are, in particular, methyl, ethyl, n-propyl and isopropyl radicals, but also the $C_4$- to $C_8$- alkyl radicals mentioned as preferred R radicals, and nonyl and decyl radicals, and the 2-methoxyethoxy radical.

Examples of preferred radicals represented by R" are the beta-aminoethyl-gamma-aminopropyl radical, the 3-mercaptopropyl radical, the 3-aminopropyl radical, the 3-(N-cyclohexyl)aminopropyl radical, the 3-methacryloxypropyl radical, the 3-acryloxypropyl radical, the 3-morpholinopropyl radical, the 3-(N-methyl)aminopropyl radical and the glycidoxypropyl radical.

The average value for a is preferably between 1.9 and 2.1, and more preferably between 1.95 and 2.05.

The organopolysiloxanes of formula (I) which are present in the compositions of this invention are preferably prepared by reacting the alpha,omega-dihydroxypolyorganosiloxanes with silanes of the formula

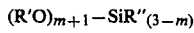 (II)

where R', R" and m are the same as above.

However, if R" has the meaning

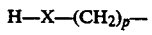

in which p is 2 or 3 and X is a sulfur atom or a radical of the formula —NR², where R² is a hydrogen atom or an alkyl, cycloalkyl, aminoalkyl or mercaptoalkyl group, having from 1 to 6 carbon atoms, which is particularly preferred, the alpha,omega-dihydroxypolyorganosiloxanes are reacted preferably with silanes of the formulas

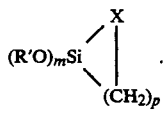     (III)

Examples of silanes of formula (II) are methacryloxypropyltrimethoxysilane, glycidoxypropyltriethoxysilane, mercaptopropyltrimethoxysilane, beta-aminoethyl-gamma-aminopropyltrimethoxysilane, beta-aminoethyl-gamma-aminopropyltriethoxysilane and beta-aminoethyl-gamma-aminopropylmethyldimethoxysilane.

Examples of silanes of formula (III) are those of the formulas

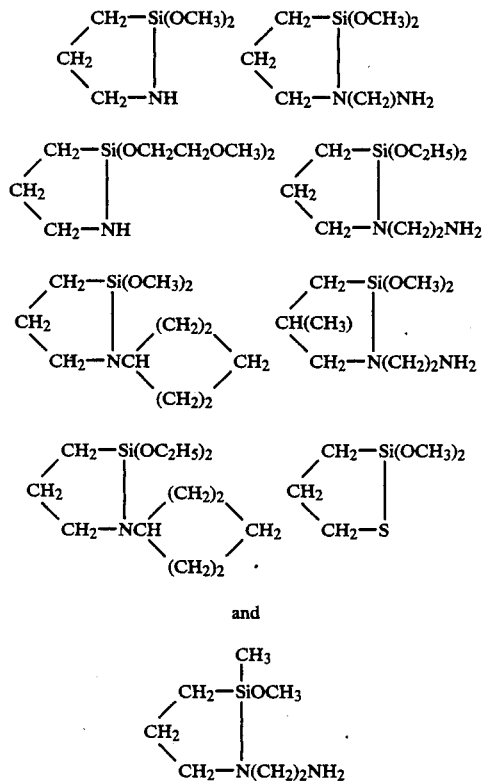

The reaction of alpha, omega-dihydroxypolorganosiloxanes with silanes of formula (II) is preferably carried out at temperatures of from 20° C. to 150° C., and in particular, from 20° C. to 80° C., and the reaction with silanes of formula (III) is preferably carried out at from 10° C. to 60° C., and in particular from 15° C. to 30° C.

The organopolysiloxanes of formula (I) preferably have a viscosity of from 50 to 1,000,000 mPa.s, and more preferably from 20,000 to 350,000 mPa.s, measured at 23° C.

In order for the reaction of the alpha,-omegadihydroxypolyorganosiloxane with silanes of the formulas (II) and (III) to proceed to completion, from 5 to 20 parts by weight of the silanes of formula (II) and/or (III) can be employed per part by weight of the alpha,omega-dihydroxypolyorganosiloxane. The silanes of formulas (II) and (III), which do not react during the reaction, are not detrimental to the organopolysiloxane compositions of this invention and can, therefore, remain in the reaction mixture. Likewise, the alcohol of the formula R'OH liberated by the condensation of a silane of formula (II) with silanol groups is not a problem in the compositions of this invention. However, it is preferred that a maximum of 5, and more preferably from 1 to 4, parts by weight of silanes of formulas (II) and/or (III) be employed per 100 parts by weight of the alpha,omega-dihydroxypolyorganosiloxane.

At the temperatures described above, the reaction of the two components is in general complete in about one hour, and more preferably in about 30 minutes.

In addition to the organopolysiloxanes of formula (I), the compositions of this invention contain salts of metals of the second main group and sub-group of the Periodic Table with branched-chain carboxylic acids having from 5 to 15, and more preferably from 6 to 12, carbon atoms. Due to their low toxicity, magnesium, calcium and zinc salts are preferred, and in particular calcium and zinc salts. The salts of 2-ethylhexanoic acid are preferred. Salts of other metals, such as cobalt and iron, result in discoloration of the vulcanized composition.

The carboxylic acid salts described above increase the shelf life of the composition and are also effective, even at elevated temperatures. Elevated temperatures, for example 30° to 50° C., are attained, for example, if the compositions of this invention are stored outside in summer, for example on building sites. If compositions stored in this way do not contain the metal salts of branched carboxylic acids mentioned above, the compositions may no longer cure, or only do so incompletely, at room temperature to form elastomers.

The organopolysiloxane compositions of this invention may contain one or more organopolysiloxane(s) of formula (I), and may contain one or more metal salt(s) of branched-chain carboxylic acids of the type mentioned above.

The organopolysiloxane compositions of this invention preferably contain from 1 to 5 percent and more preferably from 2 to 4 percent by weight of metal salts of the type mentioned above, based on the total weight of the organopolysiloxane composition (including additives which may be incorporated therein).

The metal salts mentioned above may be added to the organopolysiloxanes of formula (I) after the organopolysiloxanes have been prepared and/or during their preparation, for example, from alpha, omega-dihydroxypolyorganosiloxanes and silanes of formula (II) and/or (III).

The organopolysiloxane compositions of this invention must be prepared and stored under essentially anhydrous conditions, since otherwise the composition may cure prematurely.

In addition to the components mentioned above, the organopolysiloxane compositions of this invention may contain additional components which are known per se.

Additional substances which may preferably be used in the preparation of the compositions of this invention are silanes of the formula $$R_rSi(OR')_{4-r} \quad (IV)$$

in which R and R' are the same as above and r is 0 or 1, or partial hydrolysates thereof, such as hexamethoxydisiloxane. Likewise, condensation catalysts, reinforcing fillers, non-reinforcing fillers, pigments, soluble dyes, fragrances, plasticizers, such as dimethylpolysiloxanes which are end-blocked by trimethylsiloxy groups and are liquid at room temperature, or phosphoric acid esters, fungicides, resinous organopolysiloxanes, including those synthesized from $(CH_3)_3SiO_{\frac{1}{2}}$ and $SiO_{4/2}$ units, purely organic resins, such as homopolymers or copolymers of acrylonitrile, styrene, vinyl chloride or propylene, and in particular copolymers of styrene and n-butyl acrylate, which may have already been prepared in the presence of diorganopolysiloxanes containing one Si-bonded hydroxyl group in each of the terminal units by polymerization of the monomers mentioned above by means of free radicals can be used in the compositions of this invention. Other substances which may be employed in the compositions of this invention are corrosion inhibitors, polyglycols, which may be esterified and/or etherified, oxidation inhibitors, heat stabilizers, solvents, agents for influencing the electrical properties, such as conductive carbon black, flame retardants, light screens and agents for extending the skinning time, such as silanes containing SiC-bonded mercaptoalkyl radicals, and blowing agents, for example, azodicarbonamide.

Similarly, adhesion promoters, preferably aminofunctional silanes, can be added to the compositions of this invention.

Condensation catalysts are preferably employed in the compositions of this invention. Any condensation catalysts which have been or could have been employed in compositions which have a long shelf life in the absence of water and crosslink at room temperature in the presence of water to form elastomers can be employed in the compositions of this invention. These include all the condensation catalysts mentioned in the previously cited U.S. Pat. No. 4,424,157 to Chung. Examples of preferred condensation catalysts are butyl titanates and organic tin compounds, such as di-n-butyltin diacetate and di-n-butyltin dilaurate and products obtained from the reaction of a silane, in which each molecule preferably contains, as hydrolyzable groups, at least two monovalent hydrocarbon radicals which are bonded to silicon via oxygen and are optionally substituted by an alkoxy group, or an oligomer thereof, with a diorganotin diacylate, where all the valences of the tin atoms in these reaction products are saturated by oxygen atoms of the group ≡SiOSn≡ or by SnC-bonded monovalent organic radicals. The preparation of reaction products of this type is described in detail in U.S. Pat. No. 4,460,761 to Schiller et al. The compositions of this invention also preferably contain fillers. Examples of fillers are non-reinforcing fillers, i.e., fillers having a BET surface area of up to 50 m²/g, such as quartz, diatomaceous earth, calcium silicate, zirconium silicate, zeolites, metal oxide powders, such as aluminum oxide, titanium oxide, iron oxide or zinc oxide, or mixed oxides thereof, barium sulfate, calcium carbonate, gypsum, silicon nitride, silicon carbide, boron nitride, glass powder and organic powders, such as polyacrylonitrile powder; reinforcing fillers, i.e., fillers having a BET surface area greater than 50 m²/g, such as pyrogenically produced silica, precipitated silica, carbon black, such as furnace and acetylene black, and silicon/aluminum mixed oxides having a greater BET surface area; fibrous fillers, such as asbestos and plastic fibers. The fillers mentioned may be rendered hydrophobic, for example, by treatment with organosilanes or organosiloxanes or with stearic acid or by etherification of hydroxyl groups to form alkoxy groups. It is possible to employ only one type of filler, or a mixture of at least two fillers may be employed.

In order to prepare the compositions of this invention, all the components of the particular composition can be mixed with one another in any desired sequence. This mixing preferably takes place at room temperature. If desired, this mixing can, however, also take place at elevated temperatures, for example, at temperatures in the range of from 35° C. to 135° C. During this mixing, the presence of water is preferably excluded as much as possible.

The usual water content of the atmosphere is sufficient to crosslink the compositions of this invention. If desired, the crosslinking can also be carried out at temperatures higher or lower than room temperature, for example, at −5° to 10° C. or at 30° to 50° C.

The compositions of this invention are highly suitable, for example, as sealants for joints, including vertical joints, and similar spaces, having for example, widths of from 10 to 40 mm, such as on buildings, land, water and air vehicles, or as adhesives or putties, for example, in window construction or in the manufacture of aquariums or display cabinets, and also for example, in the formation of protective coatings, including those for surfaces which are constantly exposed to fresh or sea water, or non-slip coatings, or of rubber-elastic moldings and for the insulation of electrical or electronic equipment.

In the process of this invention for stabilizing organopolysiloxane compositions which can be crosslinked with the elimination of alcohols, the salts of the 2nd main group and sub-group of the Periodic Table with branched-chain carboxylic acids (metal salts) can be added to the compositions in any process step. Preferably, the stabilized compositions are organopolysiloxanes of formula (I), which optionally may contain the additives mentioned above.

In the process of this invention, the metal salts are preferably employed in amounts of from 1 to 5 percent by weight, based on the total weight of the organopolysiloxanes (including additives).

In the following examples, all parts and percentages are by weight, unless otherwise specified.

In the following examples, the Shore A hardness is determined in accordance with DIN (Deutsche Industrie Norm) 53505, the elongation at break in accordance with DIN 53504 using an S 3A standard test specimen and the tear strength is determined in accordance with DIN 53504 using an S 3A standard test specimen.

EXAMPLES

A: Preparation of organopolysiloxanes of formula (I):
(1) About 500 parts by weight of a polydimethylsiloxane containing one hydroxyl group in each of the terminal units and having a viscosity of 80,000 mPa.s at 23° C. were mixed with 15 parts by weight of 3-cyclohexylaminopropyltrimethoxysilane (available from Wacker-Chemie GmbH) with exclusion of water at a temperature of about 23° C. in a 1 liter glass vessel equipped with stirrer and reflux condenser, and the resultant mixture was stirred for 30 minutes. According to the $^{29}$Si NMR spectrum, the reaction product no longer contains significant amounts of silanol groups.

(2) The procedure described in Example A(1) was repeated, except that 25 parts by weight of 3-methacryloxypropyltrimethoxysilane were substituted for the 15 parts by weight of 3-cyclohexylaminopropyltrimethoxysilane and the mixture thus obtained was stirred for 30 minutes at 80° C. instead of at 23° C. The alcohol remaining in the reaction mixture was not removed since it did not affect the shelf life of the organopolysiloxane compositions of this invention.

(3) The procedure described in Example A(1) was repeated, except that 15 parts by weight of 1,1-diethoxy-1-sila-2-cyclohexyl-2-azacyclopentane (obtained by intramolecular cyclization of 3-cyclohexylaminopropyltriethoxysilane by heating) were substituted for the 15 parts by weight of 3-cyclohexylaminopropyltrimethoxysilane. The reaction proceeded significantly faster than in Example A(1).

B: Production of organopolysiloxane compositions of this invention and comparison examples

EXAMPLE 1

About 60 g of polydimethylsiloxane containing trimethylsiloxy groups as terminal units and having a viscosity of 100 mm$^2$/s at 23° C., 2 g of zinc 2-ethylhexanoate (available from Acima), 1.6 g of beta-aminoethyl-gamma-aminopropyltrimethoxysilane (available from Wacker-Chemie), 20 g of pyrogenic silica (available as HDK-V 15 from Wacker-Chemie GmbH), 12 g of tetraethyl silicate and 0.2 g of di-n-butoxy-bis(triethoxysiloxy)stannane (prepared in accordance with European Patent B 90,409) were added with exclusion of water to 100 g of the polymer whose preparation is described in Example A(1), and the mixture was homogenized and transferred into moisture-tight containers. After various periods of time, samples were removed and physical properties of the elastomers produced therefrom were determined. Results obtained from this experiment are shown in Table 1.

TABLE 1

| Storage Time Days | Shore A DIN 53505 | Tear Strength DIN 53504-S3A N/mm$^2$ | Elongation at break DIN 53504-S3A Percent | Tear Propagation Strength ASTM D 624 Form B N/mm | Stress at 100% Elongation DIN 53504-S3A N/mm$^2$ |
|---|---|---|---|---|---|
| 7 | 17 | 1.6 | 510 | 4.0 | 0.32 |
| 28 | 16 | 1.7 | 450 | 4.0 | 0.33 |
| 56 | 18 | 1.8 | 520 | 3.9 | 0.36 |
| 112 | 20 | 1.8 | 435 | 4.1 | 0.38 |
| 168 | 21 | 1.8 | 480 | 4.1 | 0.40 |

COMPARISON EXAMPLE 1

Example 1 was repeated, except that zinc 2-ethylhexanoate was omitted. The resultant physical data are shown in Table 2.

TABLE 2

| Storage Time Days | Shore A DIN 53505 | Tear Strength DIN 53504-S3A N/mm$^2$ | Elongation at break DIN 53504-S3A Percent | Tear Propagation Strength ASTM D 624 Form B N/mm | Stress at 100% Elongation DIN 53504-S3A N/mm$^2$ |
|---|---|---|---|---|---|
| 7 | 17 | 1.5 | 520 | 4.2 | 0.31 |
| 28 | 17 | 1.6 | 610 | 3.8 | 0.22 |
| 56 | 12 | 0.8 | 885 | 1.5 | 0.13 |
| 112 | 8 | 0.2 | 940 | 0.8 | 0.06 |
| 168 | 5 | / | / | / | / |

EXAMPLE 2

About 32 g of a polydimethylsiloxane containing trimethylsiloxy groups as terminal units and having a viscosity of 100 mm$^2$/s at 25° C., 5.0 g of calcium 2-ethylhexanoate (available from Acima), 3 g of 3-aminopropyltriethoxysilane, 130 g of coated chalk (available from ICI as "Winnofil SP"), 10 g of methyltrimethoxysilane and 1 g of tetra-isopropyl titanate were added with exclusion of water to 100 g of the polymer whose preparation is described in Example A(1), and the mixture was homogenized. The composition was further treated in accordance with Example 1. The resultant physical data are shown in Table 3.

TABLE 3

| Storage Time Days | Shore A DIN 53505 | Tear Strength DIN 53504-S3A N/mm$^2$ | Elongation at break DIN 53504-S3A Percent | Tear Propagation Strength ASTM D 624 Form B N/mm | Stress at 100% Elongation DIN 53504-S3A N/mm$^2$ |
|---|---|---|---|---|---|
| 7 | 31 | 1.47 | 370 | 7.7 | 0.68 |
| 28 | 32 | 1.51 | 340 | 7.5 | 0.78 |
| 56 | 32 | 1.55 | 360 | 7.5 | 0.74 |
| 112 | 33 | 1.48 | 310 | 6.3 | 0.60 |
| 168 | 32 | 1.57 | 320 | 6.8 | 0.70 |

COMPARISON EXAMPLE 2

Example 2 was repeated, except that calcium 2-ethylhexanoate was omitted. The resultant physical data are shown in Table 4.

TABLE 4

| Storage Time Days | Shore A DIN 53505 | Tear Strength DIN 53504-S3A N/mm² | Elongation at break DIN 53504-S3A Percent | Tear Propagation Strength ASTM D 624 Form B N/mm | Stress at 100% Elongation DIN 53504-S3A N/mm² |
| --- | --- | --- | --- | --- | --- |
| 7   | 30 | 1.51 | 380 | 7.5 | 0.71 |
| 28  | 27 | 1.38 | 420 | 6.4 | 0.65 |
| 56  | 23 | 1.17 | 580 | 4.9 | 0.52 |
| 112 | 12 | 0.83 | 670 | 2.8 | 0.32 |
| 168 | 5  | /    | 980 | /   | /    |

EXAMPLE 3

About 50 g of a polydimethylsiloxane containing trimethylsiloxy groups in the terminal units and having a viscosity of 100 mm²/s at 25° C., 6 g of zinc 2-ethylhexanoate, 50 g of aluminum silicate, 15 g of tetraethyl silicate and 0.8 g of tetra-isopropyl titanate were added with the exclusion of water to 100 g of the polymer prepared in accordance with Example A(3), and the mixture thus obtained was homogenized. The composition was further treated in accordance with Example 1. The physical data are shown in Table 5.

TABLE 5

| Storage Time Days | Shore A DIN 53505 | Tear Strength DIN 53504-S3A N/mm² | Elongation at break DIN 53504-S3A Percent | Tear Propagation Strength ASTM D 624 Form B N/mm | Stress at 100% Elongation DIN 53504-S3A N/mm² |
| --- | --- | --- | --- | --- | --- |
| 7   | 28 | 2.5 | 360 | 6.5 | 0.45 |
| 28  | 29 | 2.3 | 380 | 6.4 | 0.42 |
| 56  | 31 | 2.6 | 345 | 6.7 | 0.46 |
| 112 | 30 | 2.5 | 330 | 6.6 | 0.44 |
| 168 | 31 | 2.8 | 330 | 6.6 | 0.39 |

COMPARISON EXAMPLE 3

Example 3 was repeated, except that zinc 2-ethylhexanoate was omitted. The physical data are shown in Table 6.

TABLE 6

| Storage Time Days | Shore A DIN 53505 | Tear Strength DIN 53504-S3A N/mm² | Elongation at break DIN 53504-S3A Percent | Tear Propagation Strength ASTM D 624 Form B N/mm | Stress at 100% Elongation DIN 53504-S3A N/mm² |
| --- | --- | --- | --- | --- | --- |
| 7   | 29 | 2.3 | 420 | 6.7 | 0.48 |
| 28  | 16 | 1.7 | 690 | 4.8 | 0.23 |
| 56  | 8  | 0.5 | 835 | 1.6 | 0.05 |
| 112 | /  | /   | /   | /   | /    |
| 168 | /  | /   | /   | /   | /    |

COMPARISON EXAMPLE 4

Example 1 was repeated, except that 4 g of zinc noctanoate were substituted for 2 g of zinc 2-ethylhexanoate. The corresponding physical data are shown in Table 7 below.

TABLE 7

| Storage Time Days | Shore A DIN 53505 | Tear Strength DIN 53504-S3A N/mm² | Elongation at break DIN 53504-S3A Percent | Tear Propagation Strength ASTM D 624 Form B N/mm | Stress at 100% Elongation DIN 53504-S3A N/mm² |
| --- | --- | --- | --- | --- | --- |
| 7   | 17 | 1.6 | 550 | 4.2 | 0.32 |
| 28  | 18 | 1.6 | 580 | 3.9 | 0.26 |
| 56  | 15 | 1.4 | 820 | 1.6 | 0.17 |
| 112 | 7  | 0.4 | 880 | 0.7 | /    |
| 168 | 5  | /   | /   | /   | /    |

What is claimed is:

1. A process for stabilizing an organopolysiloxane composition which can be crosslinked at room temperature with the elimination of an alcohol, which comprises adding a salt of a metal with a branched-chain carboxylic acid having from 5 to 15 carbon atoms, in which the metal is selected from the group consisting of magnesium, calcium, barium, strontium and zinc, to an organopolysiloxane having R' groups and SiC-bonded alkyl radicals which are substituted with radicals selected from the group consisting of amino, mercapto, acryloxy, methacryloxy, epoxy, allyl and cyclohexenyl groups linked to the terminal silicon atoms, where R' is selected from the group consisting of monovalent hydrocarbon radicals having from 1 to 10 carbon atoms and monovalent hydrocarbon radicals having from 1 to 10 carbon atoms which are substituted by $C_1$ to $C_3$ alkoxy groups.

2. The organopolysiloxane composition of claim 1, wherein the salt of the metal is employed in an amount of from 1 to 5 percent by weight, based on the total weight of the organopolysiloxane composition.

3. An organopolysiloxane composition containing (1) an organopolysiloxane of the formula

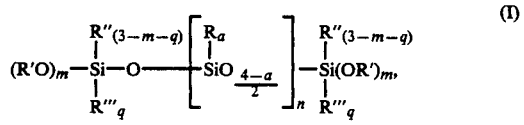
(I)

in which the R radicals are selected from the group consisting of monovalent hydrocarbon radicals and substituted monovalent hydrocarbon radicals having from 1 to 13 carbon atoms; R' radicals are selected from the group consisting of monovalent hydrocarbon radicals having from 1 to 10 carbon atoms and monovalent hydrocarbon radicals having from 1 to 10 carbon atoms which are substituted by $C_1$ to $C_3$- alkoxy groups; R" radicals are SiC-bonded substituted alkyl radicals which have from 1 to 18 carbon atoms and whose substituents are selected from the group consisting of amino, mercapto, acryloxy, methacryloxy, epoxy, allyl and cyclohexenyl groups; R''' radicals are $C_1$- to $C_3$- alkyl radicals; n is an integer having a value of at least 50; m is 1 or 2 and q is 0 or 1, with the proviso that 3-m-q is at least 1; a is an integer having a value of 0, 1, 2 or 3 and an average value of 1.8 to 2.2, and (2) a salt of a metal where the metal is selected from the group consisting of magnesium, calcium, barium, strontium and zinc with a branched-chain carboxylic acid having from 5 to 15 carbon atoms.

4. The composition of claim 3, wherein the metal is magnesium.

5. The composition of claim 3, wherein the metal is calcium.

6. The composition of claim 3, wherein the metal is zinc.

7. The composition of claim 3, wherein the branched-chain carboxylic acid has from 6 to 12 carbon atoms.

8. The composition of claim 3, wherein the salt of a metal is zinc 2-ethylhexoanoate.

9. The composition of claim 3, wherein the salt of a metal is calcium 2-ethylhexanoate.

10. The process of claim 1, wherein the organopolysiloxane has the formula

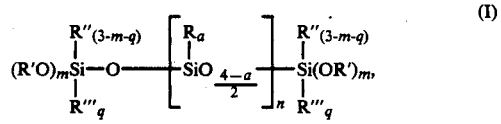
(I)

in which the R radicals are selected from the group consisting of monovalent hydrocarbon radicals and substituted monovalent hydrocarbon radicals having from 1 to 13 carbon atoms; R' radicals are selected from the group consisting of monovalent hydrocarbon radicals having from 1 to 10 carbon atoms and monovalent hydrocarbon radicals having from 1 to 10, carbon atoms which are substituted by $C_1$- to $C_3$- alkoxy groups; R''' radicals are SiC-bonded substituted alkyl radicals which have from 1 to 18 carbon atoms and whose substituents are selected from the group consisting of amino, mercapto, acryloxy, methacryloxy, epoxy, allyl and cyclohexenyl groups; R''' radicals are $C_1$- to $C_3$- alkyl radicals; n is an integer having a value of at least 50; m is 1 or 2 and q is 0 or 1, with the proviso that 3-m-q is at least 1; a is in each case an integer having a value of 0, 1, 2 or 3 and an average value of 1.8 to 2.2.

11. The organopolysiloxane composition of claim 3, wherein the salt of the metal is employed in an amount of from 1 to 5 percent by weight, based on the total weight of the organopolysiloxane composition.

* * * * *

UNITED STATES PATENT AND TRADEMARK OFFICE
CERTIFICATE OF CORRECTION

PATENT NO. : 4,942,211

DATED : July 17, 1990

INVENTOR(S) : Oswin Sommer, Norman Dorsch, Erhard Bosch and Alfred Kurz

It is certified that error appears in the above-identified patent and that said Letters Patent is hereby corrected as shown below:

Column 10, line 34, "R'" should read "R'O".

Column 12, line 24, after "10", delete the comma.

Column 12, line 25, "R"' " should read "R" ".

Signed and Sealed this

Twenty-fourth Day of September, 1991

Attest:

HARRY F. MANBECK, JR.

Attesting Officer

Commissioner of Patents and Trademarks